Sept. 18, 1956 L. C. GALLI 2,763,408
DEVICE FOR USE IN DISPENSING FLOWABLE SUBSTANCES
Filed April 28, 1954
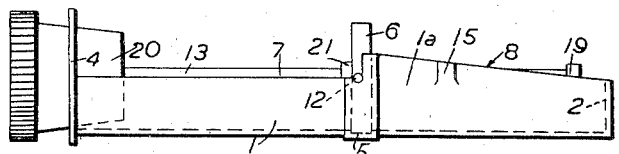
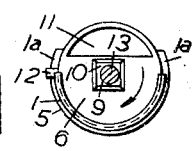
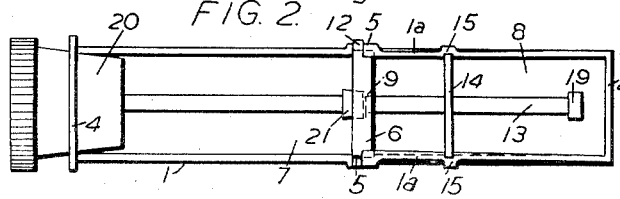
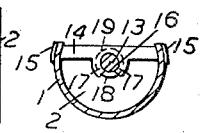
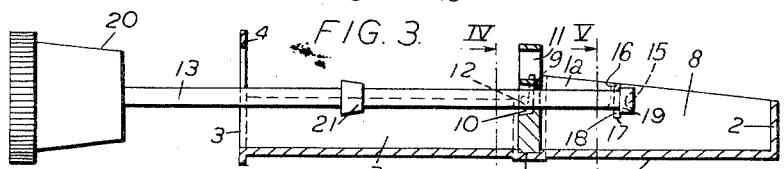
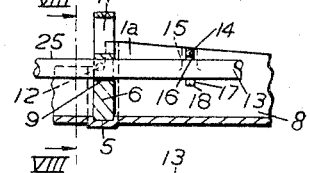
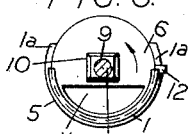
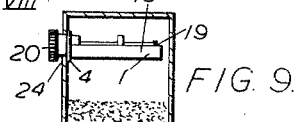
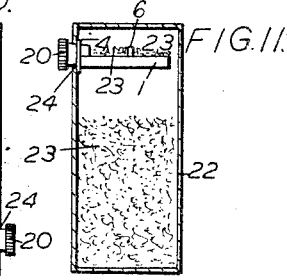
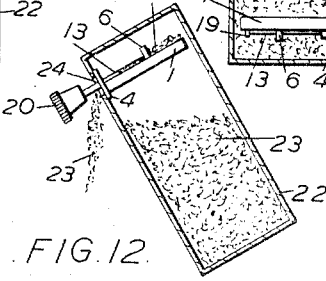
Inventor
LEON CLEMENT GALLI
Attorneys

United States Patent Office 2,763,408
Patented Sept. 18, 1956

2,763,408
DEVICE FOR USE IN DISPENSING FLOWABLE SUBSTANCES

Leon Clement Galli, Auckland, Auckland, New Zealand, assignor to Galli Stomach Powders (Australasia) Limited, Auckland, Auckland, New Zealand, a body corporate of New Zealand Application April 28, 1954, Serial No. 426,234

Claims priority, application New Zealand May 19, 1953

5 Claims. (Cl. 222—436)

The invention relates to a device for use in dispensing flowable substances including powders or other comminuted or granular materials, as well as liquids. For simplicity, the substance to be dispensed will be referred to in the following description and claims as powder.

One of the objects of the invention is to provide, for the purpose stated, a device which is of simple form and lends itself to manufacture at an economical price by mass-production methods.

Another object of the invention is to provide a device capable of being applied to a receptacle containing powder in such a way that quantities of the powder, each in substantially accurate measure, can be dispensed from the receptacle when desired.

A further object of the invention is to provide a device so constructed, and capable of being applied to a receptacle containing powder in such a way, that a selected one of a plurality of available measures of powder can be dispensed from the receptacle when desired and according to choice.

A still further object of the invention is to provide a device so constructed that when it is applied to a receptacle containing powder as already mentioned; it will act as a closure for the receptacle when not in use.

The dispensing device of the invention comprises a trough substantially of part-cylindrical shape for reception of powder to be dispensed, the trough having one end open and the other end permanently closed, or adapted to be thus closed, a disc arranged transversely of and mounted for rotation in the trough, and means enabling a rotary movement to be imparted to the disc when desired, the disc being formed with an aperture so located that it will be brought from an elevated position to a lowered position, or vice versa, relatively to the trough when the disc is rotated.

The manner in which the device of the invention is applied and used will be explained in the following detailed description of the embodiment, and modification thereof, illustrated in the accompanying drawings, in which:

Figure 1 is a side elevational view of the device with the parts in one position;

Figure 2 is a plan view corresponding to Figure 1;

Figure 3 is a longitudinal sectional view of the device with the parts in another position;

Figure 4 is a cross-sectional view on the line IV—IV of Figure 3;

Figure 5 is a cross-sectional view on the line V—V of Figure 3;

Figure 6 is a view similar to that of Figure 4 but showing the disc in a different position;

Figure 7 is a fragmentary longitudinal sectional view illustrating a modification;

Figure 8 is a cross-sectional view on the line VIII—VIII of Figure 7; and

Figures 9 to 12 are diagrammatical sectional views serving to demonstrate how the device is applied and used.

As illustrated in Figures 1 to 6, the device comprises a trough 1 of substantially semi-cylindrical shape, the trough being closed at one end as indicated at 2 and open at the other end as indicated at 3 (Figure 3). At its open end 3 the trough is formed with an annular outwardly protruding flange 4, the purpose of which will be explained presently.

Between the ends 2 and 3 of the trough 1, the inner surface of the latter is formed with a transversely extending groove 5 providing a seating for a transversely disposed rotatable disc 6 which serves to divide the trough 1 into two compartments, one of these being a forward compartment 7 extending between the disc and the open end 3 of the trough, and the other being a rearward compartment 8 extending between the disc and the closed end 2 of the trough. The disc 6 is circular and through the centre thereof there passes a circular hole 9. In the face of the disc nearest the open end 3 of the trough there is formed a recess 10 surrounding the hole 9 and of angular shape in cross-section, this recess constituting a keyway. In the embodiment illustrated in Figures 1 to 6 the recess 10 is shown to be of square shape in cross-section.

The disc 6 is formed with an aperture 11 substantially of half-moon shape, this aperture lying within the confines of one-half of the disc so that it is radially offset from the hole 9 and recess 10. On the peripheral edge of the disc 6 there is provided a projection 12 which normally engages with either one of the two longitudinal upper edges of the trough 1 and thus acts as a stop limiting the extent to which the disc can be rotated in either direction. The projection 12 is so positioned relatively to the aperture 11 that when the projection 12 is in engagement with one of the upper edges of the trough 1, the aperture 11 will lie in a fully elevated position above the trough 1 as indicated in Figures 3 and 4, so that the closed part of the disc lying below the aperture will be situated within the trough and thus act to separate the forward compartment 7 of the trough from the rearward compartment 8. When the disc 6 is rotated by 180°, the projection 12 will be brought into engagement with the other upper edge of the trough 1 and, in this position, the aperture 11 will lie in a fully lowered position within the trough as indicated in Figure 6, thus serving to place the compartment 7 in communication with the compartment 8.

To enable the disc 6 to be rotated in the manner described, there is provided a cylindrical rod 13 extending centrally along the trough 1 and passing slidably and rotatably through the hole 9 in the disc, this hole thus affording partial support for the rod. Further support for the rod 13 is afforded by a bridge-piece 14 which extends across the rearward compartment 8 of the trough 1 and the ends of which are engaged and suitably secured in indentations 15 formed in the longitudinal edge portions of the trough, the bridge-piece being formed with a hole 16 through which the rod passes slidably and rotatably. As indicated more clearly in Figure 5, the hole 16 is formed by the provision on the lower edge of the bridge-piece 14 of two horns 17 curving towards one another but not meeting so that there is left between them a gap 18 of a width which is less than the diameter of the rod 13. With this arrangement, it is possible to secure the bridge-piece 14 to the trough 1 before the rod 13 is engaged with it, the rod then being presented to the gap 18 and pressed upwardly so that the horns 17 spring apart to allow the rod to pass into the hole 16, and then return to their normal positions in which they retain the rod in the hole.

The end of the rod 13 lying within the compartment 8 of the trough 1 is formed with an enlargement 19 acting to prevent the rod from being withdrawn completely from the trough. The other end of the rod 13 is provided with a stopper 20 which is adapted to close the hole defined by the annular flange 4, on the trough, and thus to close the open end 3 of the trough, when the rod is pushed inwardly of the latter. The stopper 20 is designed also to provide a finger-grip facilitating manipulation of the rod.

On the part of the rod 13 extending along the forward compartment 7 of the trough 1 there is secured a collar 21 of cross-sectional size and shape corresponding to the size and shape of the recess 10 in the disc 6. The collar 21 is so positioned along the rod 13 that, when the stopper 20 is in its operative position, the collar will be engaged in the recess 10 and will thus act as a key causing the disc 6 to be rotatably coupled to the rod. As indicated more clearly in Figures 2 and 3, the collar 21 may be tapered slightly, the same applying, if desired, to the recess 10, so as to facilitate engagement of the collar in the recess when the rod is pushed inwardly of the trough.

Figures 9 to 12 serve diagrammatically to show how the device when constructed as described in the foregoing is applied and used.

The device is secured in a horizontal position in the upper part of the interior of a receptacle 22 containing the powder 23 to be dispensed, by suitably joining the annular flange 4 to the side wall of the receptacle (see Figure 9). Instead of providing the flange 4, other means may be employed for securing the device within the receptacle in the position stated. The side wall of the receptacle 22 is formed with an outlet hole or nozzle 24 lying in register with the hole defined by the flange 4, so that the interior of the trough 1 can have communication with the outside of the receptacle.

When the rod 13 is pushed inwardly to its maximum extent, the stopper 20 will be engaged in the outlet hole 24 in the receptacle 22, thereby closing this hole and also closing the end 3 of the trough 1, so that the powder 23 cannot escape from the receptacle. In this position of the stopper, the collar 21 on the rod 13 will be engaged in the recess 10 in the disc 6. The position assumed by the aperture 11 in the disc will depend on whether the projection 12 on the disc is in contact with the one or the other of the two upper edges of the trough 1. It will be assumed that the aperture 11 is in its uppermost position as indicated in Figures 3 and 4 so that the closed part of the disc acts to separate the forward compartment 7 of the trough from the rearward compartment 8.

With the parts in the position last described, the receptacle 22 is inverted (Figure 10) and then restored to an upright position (Figure 11). This causes measures of the powder 23 within the receptacle to be collected by the forward and rearward compartments 7 and 8 of the trough 1, while the remainder of the powder returns to the lower part of the receptacle, any excess of powder supplied to the compartments falling from the trough and being added to the quantity of powder returned to the lower part of the receptacle. At this stage, the receptacle may be tapped lightly with the fingers to cause a levelling off of the powder in the compartments 7 and 8.

The stopper 20 is now pulled outwardly, causing the outlet hole 24 in the receptacle 22 to be opened so that the forward compartment 7 of the trough 1 is placed in communication with the outside of the receptacle, and also causing the rod 13 to slide longitudinally in the hole 9 in the disc 6 without disturbing the latter, as well as in the hole 16 in the bridge-piece 14. The receptacle is now tilted (Figure 12) so that the trough 1 slopes downwardly towards the open outlet hole 24, the consequence being that the part of the powder contained in the forward compartment 7 of the trough will flow out of the receptacle through the hole 24, while the part of the powder contained in the rearward compartment 8 will remain held in this compartment by the closed part of the disc 6. By making the two compartments 7 and 8 of the trough of equal effective capacity, the quantity of powder delivered from the forward compartment 7 will represent a half-measure. If, instead of obtaining delivery of a half-measure of powder, it is desired to obtain delivery of a full-measure, the following procedure is adopted: After both compartments 7 and 8 have been filled in the manner previously described, and while the stopper 20 remains in a closed position, the stopper is rotated by an angle of 180°. This causes the collar 21 on the rod 13 to rotate the disc 6 by a corresponding amount so that the aperture 11 in the disc will be brought to its lowermost position as indicated in Figure 6, thereby placing the rearward compartment 8 in communication with the forward compartment 7. If now the stopper 20 is pulled outwardly to open the outlet hole 24, and the receptacle 22 is tilted in the manner already explained, the part of the powder in the compartment 7 will be discharged and, while this is going on, the part of the powder in the compartment 8 will flow through the aperture 11 in the disc 6 into the compartment 7 and thence out of the discharge hole 24 so that this part will also be discharged. Thus a full measure of powder will be delivered.

The stopper 20, or the outside surface of the receptacle 22, or both, may bear markings to indicate to the user when the disc 6 is in half-measure position or in full-measure position.

The side walls of that part of the trough 1 defining the rearward compartment 8 may be inclined upwardly towards the disc 6 as indicated at 1a in Figures 1 to 4 and 6 so as to prevent the part of the powder in the rearward compartment 8 from spilling when the device is being used to deliver a half-measure, and also to encourage this part of the powder to flow into the forward compartment 7 through the aperture 11 when the device is being used to deliver a full-measure.

The modification illustrated in Figures 7 and 8 enables the recess 10 in the disc 6 and the collar 21 on the rod 13 to be dispensed with, while still permitting the rod to be used for rotating the disc. To this end, the rod 13 is formed with a flat surface 25, extending along its length so that it has a cross-sectional shape which is less than a full circle, while the hole 9 in the rod is made of corresponding cross-sectional shape but large enough to allow the rod to pass slidably through it. With this arrangement, the rod 13 becomes permanently keyed to the disc 6 so that rotation of the rod causes corresponding rotation of the disc, although the rod remains free to be moved longitudinally without disturbing the disc. The amount of material removed from the rod to form the flat surface 25 is such that the remainder of the cross-section of the rod represents more than a half-circle, thereby ensuring that the hole 16 in the bridge-piece 14 will still offer adequate support for the rod.

Within the scope of the invention we include not only the dispensing device as such, but also a receptacle when fitted with the device.

The possibility presents itself of making the trough 1 of such length that when it is fitted inside the receptacle 22, it will extend right across the latter so that part of the side wall of the receptacle will then act as a closure for the end 2 of the trough.

What I do claim and desire to obtain by Letters Patent of the United States of America is:

1. A device for use in dispensing powder from a container, comprising a trough substantially of part-cylindrical shape for reception of the powder, one end of the trough being permanently closed and the other end having an opening, a transversely disposed and rotatable disc arranged within the trough intermediate the ends of the latter so as to divide the trough into two compartments, the disc having an aperture radially off-set from the centre of the disc and a hole in the center thereof, a rod extending into the trough through the opening in one end thereof, the rod passing slidably and rotatably through the hole in the centre of the disc, a stopper mounted on the outer end of the rod and capable of acting to close the opening in one end of the trough when the rod is moved longitudinally in one direction, a centrally disposed and tapered recess provided in the face of the disc nearest the outer end of the rod, and a tapered collar provided on the rod in a position between the disc and the outer end of the rod, said collar being adapted to engage in said recess when the rod is moved in one direction, such engagement permitting rotation of the disc when the rod is rotated.

2. A device as claimed in claim 1 and including means for limiting the degree of rotation of the disc.

3. A device as claimed in claim 1 and including a projection provided in the peripheral edge of the disc and adapted, on rotation of the disc, to engage with an edge of the trough so as to limit the degree of such rotation.

4. A device as claimed in claim 1 and a bridge piece extending across the trough in which the rod, after passing through the disc, is slidably and rotatably engaged.

5. A container for powder, comprising a receptacle having an outlet hole provided in a side wall near the upper end thereof, and a dispensing device mounted within the receptacle, the dispensing device comprising a trough substantially of part-cylindrical shape, one end of the trough being permanently closed and the other end having an opening arranged contiguous to and in register with the outlet hole in the receptacle, a disc arranged transversely of and mounted for rotation in the trough, the disc being located intermediate the ends of the trough so as to divide the latter into two compartments, an aperture formed through the disc at a position radially off-set from the centre of the disc and a hole formed centrally therein, a rod passing freely through the outlet hole in the receptacle and the opening in one end of the trough and also passing slidably and rotatably through the hole in the centre of the disc, a stopper mounted on the outer end of the rod and adapted to close the outlet hole in the receptacle and the opening in one end of the trough when the rod is moved inwardly of the receptacle, a centrally disposed and tapered recess in the face of the disc nearest the outer end of the rod, and a tapered collar provided on the rod between the disc and the outer end of the rod, said collar being adapted to engage in the recess in the disc when the rod is moved inwardly of the receptacle, such engagement permitting rotation of the disc when the rod is rotated.

References Cited in the file of this patent

UNITED STATES PATENTS

| | | |
|---|---|---|
| 678,056 | Stadlinger | July 9, 1901 |
| 1,684,313 | Graham | Sept. 11, 1928 |
| 2,487,825 | Olvis | Nov. 15, 1949 |